April 24, 1962   S. CHARLES   3,030,908
AMPHIBIOUS TRACTOR
Filed Oct. 19, 1960
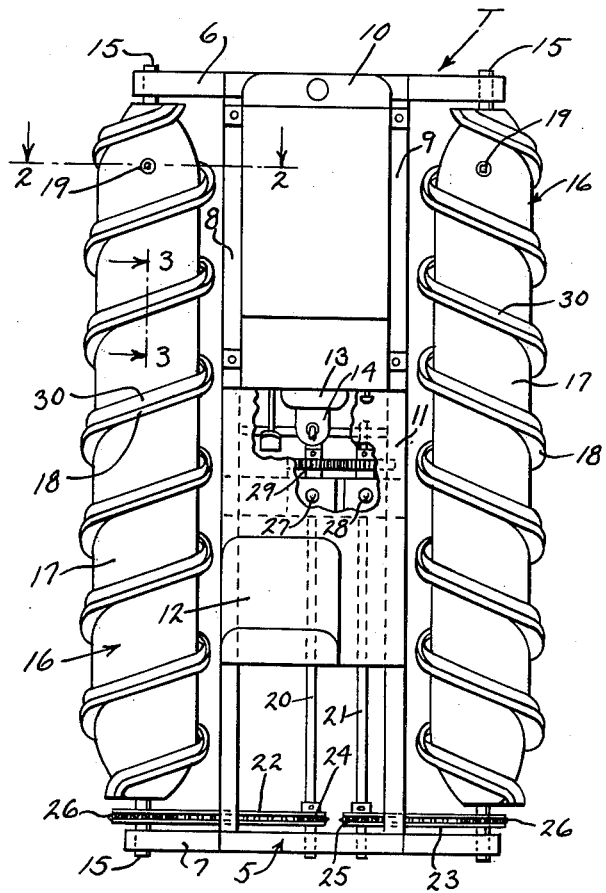
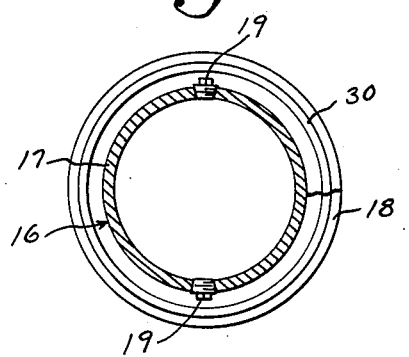
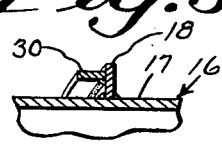
INVENTOR
STANLEY CHARLES
BY *Wright & Wright*
ATTORNEYS

United States Patent Office 3,030,908
Patented Apr. 24, 1962

3,030,908
AMPHIBIOUS TRACTOR
Stanley Charles, 125 Smith St., Plymouth, Wis.
Filed Oct. 19, 1960, Ser. No. 63,674
2 Claims. (Cl. 115—1)

This invention appertains to an amphibious tractor particularly designed for use over difficult terrain, such as swamps, mud and snow, as well as general use on land and water, and is an improvement on my pending application Serial No. 548,900, filed November 25, 1955, now abandoned.

One of the primary objects of my present invention is to improve the supporting and driving screw pontoons disposed on the opposite sides of the machine, whereby to increase the tractive force thereof and to aid in the supporting of the machine in mud and snow.

Another salient object of my invention is the provision of laterally extending cleats carried by the helical ribs of the pontoons and arranged in spaced relation to the outer surface of the body portions of the pontoons for engaging the surface over which the tractor is travelling, the cleats functioning to give a desired support to the pontoons and to prevent undue wear on the outer surface of the body portions thereof, and to increase the driving force of the pontoons.

A further important object of my invention is to provide an amphibious tractor having an improved pontoon structure of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described and claimed, and illustrated in the accompanying drawing, in which drawing, FIGURE 1 is a top plan view of my improved tractor, parts thereof being shown broken away;

FIGURE 2 is a transverse sectional view through one of the improved pontoons taken on the line 2—2 of FIGURE 1, looking in the direction of the arrows, and FIGURE 3 is a detail fragmentary longitudinal sectional view through one of the pontoons taken on the line 3—3 of FIGURE 1, looking in the direction of the arrows.

Referring to the drawing in detail, wherein similar reference characters designate corresponding parts throughout the several views, the letter T generally indicates my improved tractor and the same includes a frame 5 for supporting various parts of the device.

The frame 5 comprises transversely extending front and rear end frames 6 and 7 and these frames are rigidly connected together by longitudinally extending spaced main frame beams 8 and 9. The ends of the front and rear frames 6 and 7 project beyond the longitudinal beams 8 and 9, for a purpose, which will now appear. The front end of the frame 5 supports the power plant 10, which can be an internal combustion engine and directly in rear of the engine and supported by the beams 8 and 9 is a platform 11. This platform 11 has mounted thereon a seat 12 for the operator of the vehicle. The engine 10 is provided with all of the usual adjuncts, such as a clutch 13 and a main transmission 14. A clutch pedal and a transmission lever are arranged within the convenient reach of the operator.

The terminals of the front and rear frames 6 and 7 are provided with bearings for rotatably receiving axially disposed stub shafts 15 of longitudinally extending hollow pontoons 16. The pontoons are of the worm type and taper toward their front and rear ends to facilitate the movement of the tractor in a forward and reverse direction. The pontoons are located on opposite sides of the tractor and extend below the engine 10 and the platform 11. Each pontoon 16 includes a hollow shell 17 of a watertight character and rigidly fastened to the outer surface of the shells of the pontoons are spirally extending driving ribs 18 constituting the worm. The pontoons are provided with filler and drain plugs 19 and the pontoons can be filled with a liquid, when it is desired to add weight to the tractor for operation on land.

Arranged between the longitudinal beams 7 and 8 are spaced parallel longitudinally extending drive shafts 20 and 21. The drive shaft 20 is provided for operating the pontoon on the left hand side, see FIG. 1, and the shaft 21 is provided for driving the pontoon on the right hand side. These shafts 20 and 21 are rotatably mounted in suitable bearings carried by the frame 5 and are operatively connected to the stub shafts 15 of the pontoons through any suitable well known mechanism, such as sprocket chains 22 and 23. These sprocket chains 22 and 23 are trained over drive sprockets 24 and 25 carried respectively by the shafts 20 and 21 and over sprockets 26 keyed or otherwise fastened to the rear ends of the stub shafts 15 of the pontoons 16. A transmission 27 is provided for the shaft 20 and this transmission is disposed directly in rear of the main transmission 17. A like transmission 28 is provided for the shaft 21, and the input of this transmission is operatively connected to the power plant through meshing spur gears 29 of an equal diameter and the shaft 21 is also driven from the power plant through the main transmission 14. The transmissions 27 and 28 are provided respectively with operating levers. By providing the transmission 14, 27 and 28, the operator of the vehicle is enabled to have perfect control of the speed of each of the pontoons independently of each other, as well as the direction of rotation of the pontoons relative to one another. Thus, for short turns, one of the pontoons can be driven in a reverse direction from the other, or one pontoon can remain idle and the other be driven at a low speed.

In accordance with my present invention, I provide driving and supporting cleats or plates 30 for the helical ribs 18 of the pontoons. These cleats or plates 30 are welded, or otherwise rigidly secured, to a desired face of the ribs and extend throughout the length of the ribs. By referring to FIGURES 1 and 2, it can be seen that the cleats or plates 30 are of a considerable length and are curved to correspond to the cylindrical shape of the pontoons. The cleats or plates 30 are also spaced from the body portions of the pontoons and this can be best seen in FIGURES 2 and 3.

The cleats or plates 30 function to increase the traction or driving force of the pontoons and as the same extend laterally from the pontoon ribs 18, and in spaced relation to the body portions of the pontoons, and the same also function to support the pontoons and the machine and to relieve undue weight and wear on the body portions of the pontoons.

It is these cleats or plates that form the important feature of this invention and the same materially aid the operation of the tractor.

Changes in details may be made without departing from the spirit or the scope of this invention, but what I claim as new is:

1. In an amphibious tractor including a frame, cylindrical pontoons rotatably carried by the sides of the frame, means for rotating the pontoons, and each of said pontoons including a hollow cylindrical shell tapered at their opposite ends and helical ribs carried by the outer surfaces of the shells and extending from one end thereof to the other, and laterally extending drive and supporting cleats rigidly carried by the ribs and extending laterally therefrom throughout the length of the ribs and disposed in spaced relation to the outer face of the cylindrical shell.

2. In an amphibious tractor of the type including a frame, longitudinally extending spaced pontoons rotatably carried by the opposite sides of the frame and means for driving the pontoons, each of said pontoons including a hollow longitudinally extending shell tapering toward its opposite ends and an outstanding helical rib extending from one end of the pontoon to the other, and supporting and driving cleat plates secured to one face of the ribs and extending from one end thereof to the other, said cleat plates being curved to correspond to the curve of the shells and disposed in spaced parallel relation thereto and adjacent to the outer active edge of the helical rib.

References Cited in the file of this patent

UNITED STATES PATENTS

| | | |
|---|---|---|
| 1,289,808 | Kennedy et al. | Dec. 31, 1918 |
| 1,646,611 | Code | Oct. 25, 1927 |